US008021103B2

(12) United States Patent
Willett, Jr.

(10) Patent No.: US 8,021,103 B2
(45) Date of Patent: Sep. 20, 2011

(54) PRESSURE ACTIVATED FLOW PATH SEAL FOR A STEAM TURBINE

(75) Inventor: Fred Thomas Willett, Jr., Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 582 days.

(21) Appl. No.: 12/260,573

(22) Filed: Oct. 29, 2008

(65) Prior Publication Data

US 2010/0104427 A1 Apr. 29, 2010

(51) Int. Cl.

| | |
|---|---|
| ***F01D 25/08*** | (2006.01) |
| ***F01D 25/26*** | (2006.01) |
| ***F04B 11/00*** | (2006.01) |
| ***F04D 29/58*** | (2006.01) |
| ***F03D 11/00*** | (2006.01) |
| ***F28F 7/00*** | (2006.01) |

(52) U.S. Cl. ....... 415/48; 415/134; 415/139; 415/173.3; 415/173.5; 415/173.6; 415/170.1; 415/199.5; 415/114

(58) Field of Classification Search .................. 415/114, 415/134, 139, 170.1, 173.3, 173.5, 199.5
See application file for complete search history.

(56) References Cited

U.S. PATENT DOCUMENTS

| | | | |
|---|---|---|---|
| 5,098,257 A | 3/1992 | Hultgren et al. | |
| 5,234,318 A | 8/1993 | Brandon | |
| 5,333,993 A | 8/1994 | Stueber et al. | |
| 5,601,402 A | 2/1997 | Wakeman et al. | |
| 6,406,256 B1 | 6/2002 | Marx | |
| 6,463,729 B2 | 10/2002 | Magoshi et al. | |
| 6,926,495 B2 | 8/2005 | Diakunchak | |
| 7,287,956 B2 | 10/2007 | Bracken et al. | |
| 2008/0169616 A1 | 7/2008 | Awtar et al. | |
| 2010/0104416 A1* | 4/2010 | Willett, Jr. | 415/48 |
| 2010/0104427 A1 | 4/2010 | Willett, Jr. et al. | |

OTHER PUBLICATIONS

Nhu, Office Action Summary Ex parte Quayle for U.S. Appl. No. 12/260,548 dated Jul. 14, 2011, 7 pages.

* cited by examiner

*Primary Examiner* — David S Blum
(74) *Attorney, Agent, or Firm* — Hoffman Warnick LLC; Ernest G. Cusick

(57) ABSTRACT

A pressure activated flow path seal for a steam turbine is disclosed. In one embodiment a gap closure component is located about a rotary component and the stationary component of the steam turbine. A pressure differential activates the gap closure component to seal or reduce the radial clearance of a steam leakage path between the rotary component and the stationary component.

11 Claims, 7 Drawing Sheets

PRESSURE ACTIVATED FLOW PATH SEAL FOR A STEAM TURBINE

CROSS REFERENCE TO RELATED APPLICATIONS

This patent application relates to commonly-assigned U.S. patent application Ser. No. 12/260,548 entitled "THERMALLY-ACTIVATED CLEARANCE REDUCTION FOR A STEAM TURBINE", filed concurrently with this application.

BACKGROUND OF THE INVENTION

The present invention relates generally to seals between rotatary and stationary components of a steam turbine and more particularly to a seal activated by a pressure differential formed across the rotary component and the stationary component of a steam turbine.

In a steam turbine, a seal between rotary and stationary components is an important part of the steam turbine performance. It will be appreciated that the greater the number and magnitude of steam leakage paths, the greater the losses of efficiency of the steam turbine. For example, labyrinth seal teeth often used to seal between the diaphragms of the stationary component and the rotor or between the rotor bucket tips and the stationary shroud of the rotary component require substantial clearances to be maintained to allow for radial and circumferential movement during transient operations such as startup and shutdown of the steam turbine. These clearances are, of course, detrimental to sealing. There are also clearance issues associated with multiple independent seal surfaces, tolerance stack up of radial clearances and assembly of multiple seals, all of which can diminish steam turbine efficiency. Moreover, it is often difficult to create seals which not only increase the efficiency of the steam turbine but also increase the ability to service and repair various parts of the turbine as well as to create known repeatable boundary conditions for such parts.

BRIEF DESCRIPTION OF THE INVENTION

In one aspect of the present invention, a steam turbine is provided. The steam turbine comprises a rotary component including a plurality of circumferentially spaced buckets that are spaced at axial positions. Each of the plurality of buckets has a tip with an adjacent cover that includes one or more seal teeth. The steam turbine further comprises a stationary component that includes a plurality of diaphragms each having a diaphragm outer ring and an inner diaphragm ring separated by a mounting partition. The plurality of diaphragms are axially positioned between adjacent rows of the plurality of buckets. Each row forms a turbine stage that defines a portion of a steam flow path through the turbine. Each diaphragm outer ring has a passage formed therein that connects a high pressure end to a low pressure end. The steam turbine further comprises a gap closure component located about the rotary component and the stationary component that seals a portion of a steam leakage path. The gap closure component includes a plurality of gap closure devices. Each of the plurality of gap closure devices is located about each respective diaphragm outer ring and one or more seal teeth of a bucket cover. Each of the plurality of gap closure devices is activated by a pressure differential formed across the passage of a respective diaphragm outer ring that provides a seal of the steam leakage path through the one or more seal teeth of the bucket cover and the diaphragm outer ring.

DETAILED DESCRIPTION OF THE INVENTION

Figure 1:
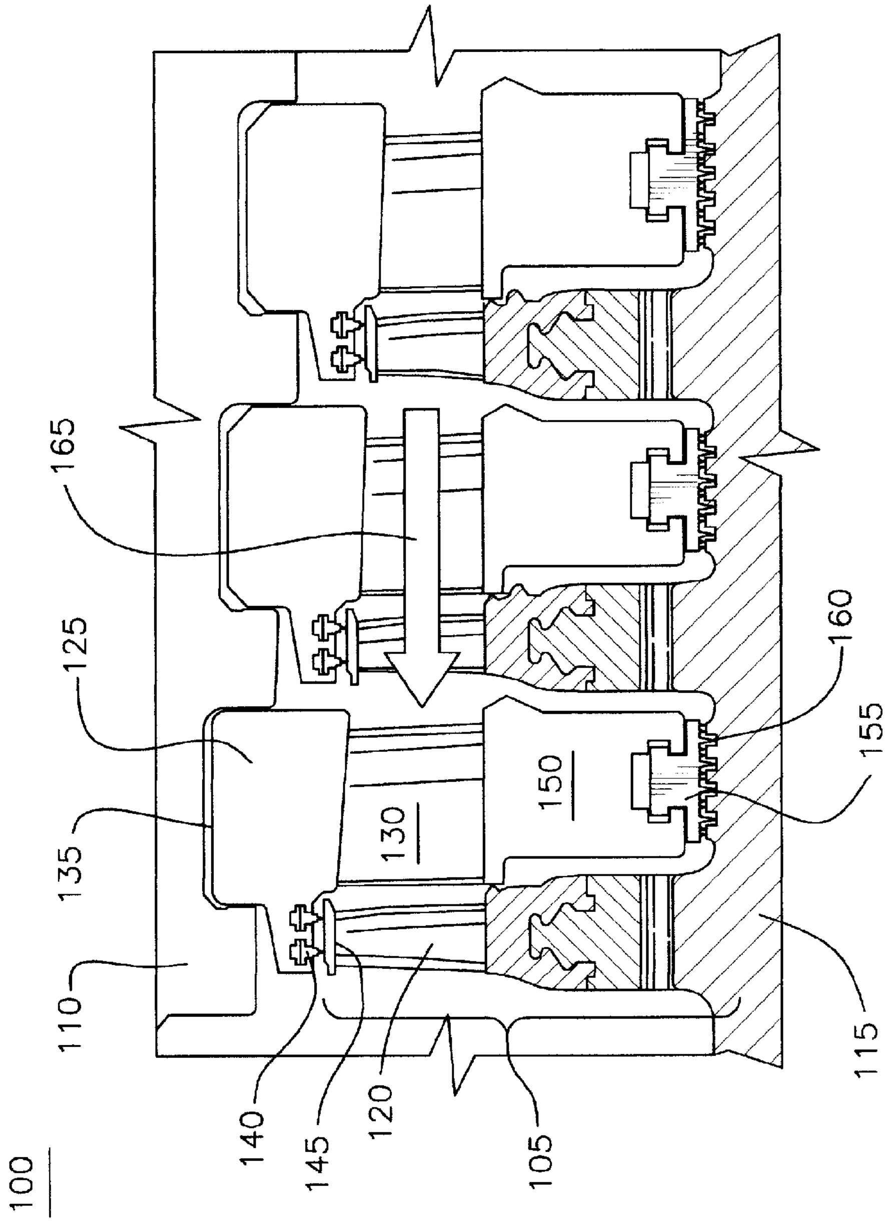
FIG. 1 is a fragmentary cross-sectional view of a portion of a steam turbine illustrating various seals according to the prior art.

Referring now to the figures, particularly to FIG. 1, there is illustrated a portion of a steam turbine 100 having a rotary component 105 and a stationary component 110. Rotary component 105 includes, for example a rotor 115 mounting a plurality of circumferentially spaced buckets 120 at spaced axial positions along the turbine forming parts of the various turbine stages. Stationary component 110 including a plurality of diaphragms 125 mounting partitions 130 defining nozzles which, together with respective buckets, form the various stages of steam turbine 100. As illustrated in FIG. 1, an outer ring 135 of the diaphragm 125 carries one or more rows of seal teeth 140 for sealing with shrouds or covers 145 adjacent the tips of buckets 120. Similarly, an inner ring 150 of diaphragm 125 mounts an arcuate seal segment 155. The seal segment has radially inwardly projecting high-low teeth 160 for sealing with rotor 115. Similar seals are provided at the various stages of steam turbine 100 as illustrated and the direction of the steam flow path is indicated by the arrow 165.

Figure 2:
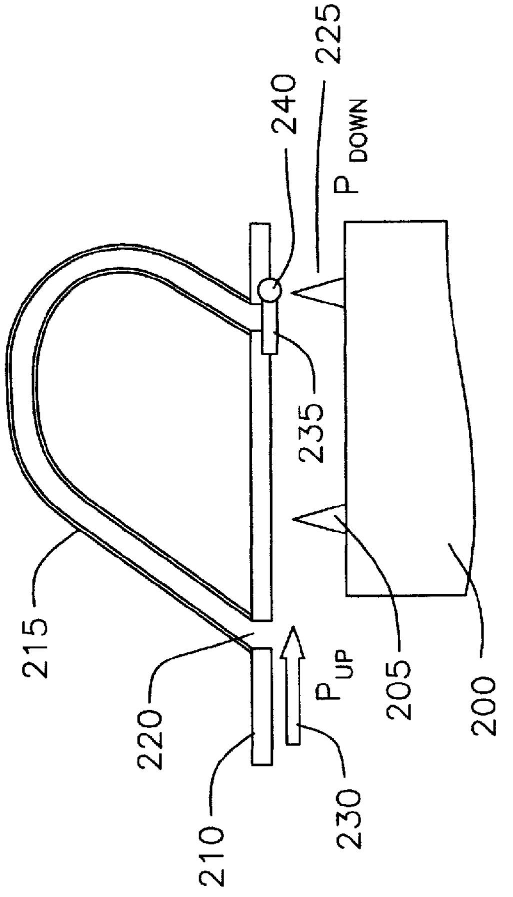
FIG. 2 is a schematic cross-sectional view of a gap closure device according to a first embodiment of the present invention.

FIG. 2 is a schematic cross-sectional view of a gap closure component according to a first embodiment of the present invention. FIG. 2, like FIGS. 3-12 show only portions of the rotary component and stationary component of the steam turbine depicted from FIG. 1 that are necessary to explain the operation of the various gap closure devices described herein. In particular, FIG. 2 shows a bucket tip and cover 200 with seal teeth 205 for the rotary component of the steam turbine and a diaphragm outer ring 210 for the stationary component of the steam turbine. Diaphragm 210 includes a passage 215 formed therein that connects a high pressure end 220 of a turbine stage to a low pressure end 225 of the turbine stage. In this embodiment, passage 215 preferably is a channel formed in diaphragm outer ring 210 that provides an alternative path for leakage from steam flow path 230 to travel as it flows from a high pressure upstream location ($P_{UP}$) to a low pressure downstream location ($P_{DOWN}$). The pressure at low pressure end 225 is lower than that at high pressure end 220 or where steam flow path 230 is designated. The pressure is lower due to the pressure drop over the first seal tooth 205. It is this differential, i.e., the pressure difference between the high pressure end 220 and low pressure end 225 that forces a gap closure component (e.g., a flap seal 235) to open and/or close. Those skilled in the art will recognize that an even greater pressure differential can be had by locating high pressure end 220 further upstream (e.g., ahead of the preceding nozzle stage). Similarly, those skilled in the art will recognize that this is equally applicable to the embodiments disclosed in FIGS. 3-10. Although passage 215 is shown in FIG. 2 as being U-shaped, those skilled in the art will recognize that other shaped passages may be utilized for moving steam flow path 230 from high pressure end 220 to low pressure end 225.

Figure 3:
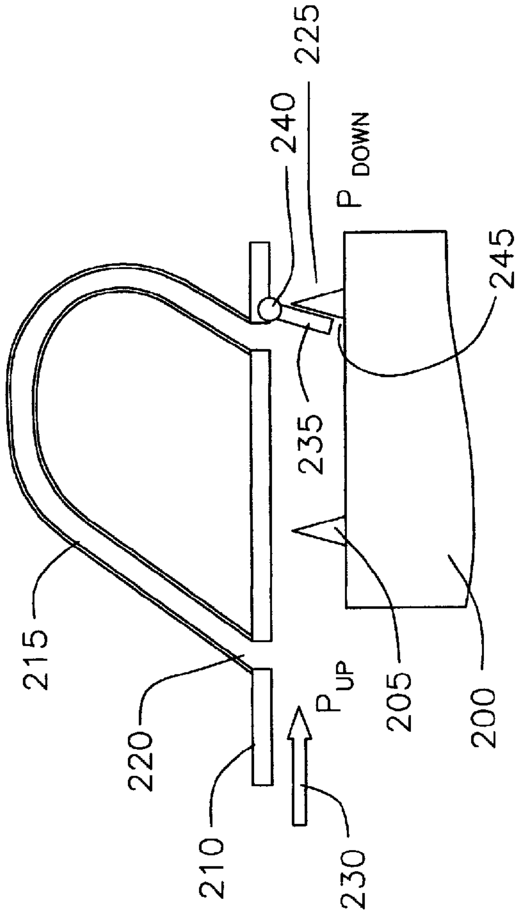
FIG. 3 is a schematic cross-sectional view showing the gap closure device of FIG. 2 in an activated state in the presence of a pressure differential.

As mentioned above, the gap closure component of the embodiment shown in FIG. 2 includes flap seal 235 hinged to diaphragm outer ring 210 near low pressure end 225 of passage 215 by a hinge 240. Flap seal 235 as shown in FIG. 2 is at rest or in the inactive state. That is, a pressure differential has not formed across high pressure end 220 and low pressure end 225. FIG. 3 shows flap seal 235 in an activated state when the pressure differential has formed. In the activated state as shown in FIG. 3, flap seal 235 moves away from low pressure end 225 of passage 215 to cover a seal tooth 205 of the bucket cover 200. In particular, flap seal 235 covers a face 245 of seal tooth 205 that is exposed to a region of high pressure of a steam leakage path. This enables flap seal 235 to cover the gap that exists between seal tooth 205 and the outboard static part of the stationary component.

Figure 4:
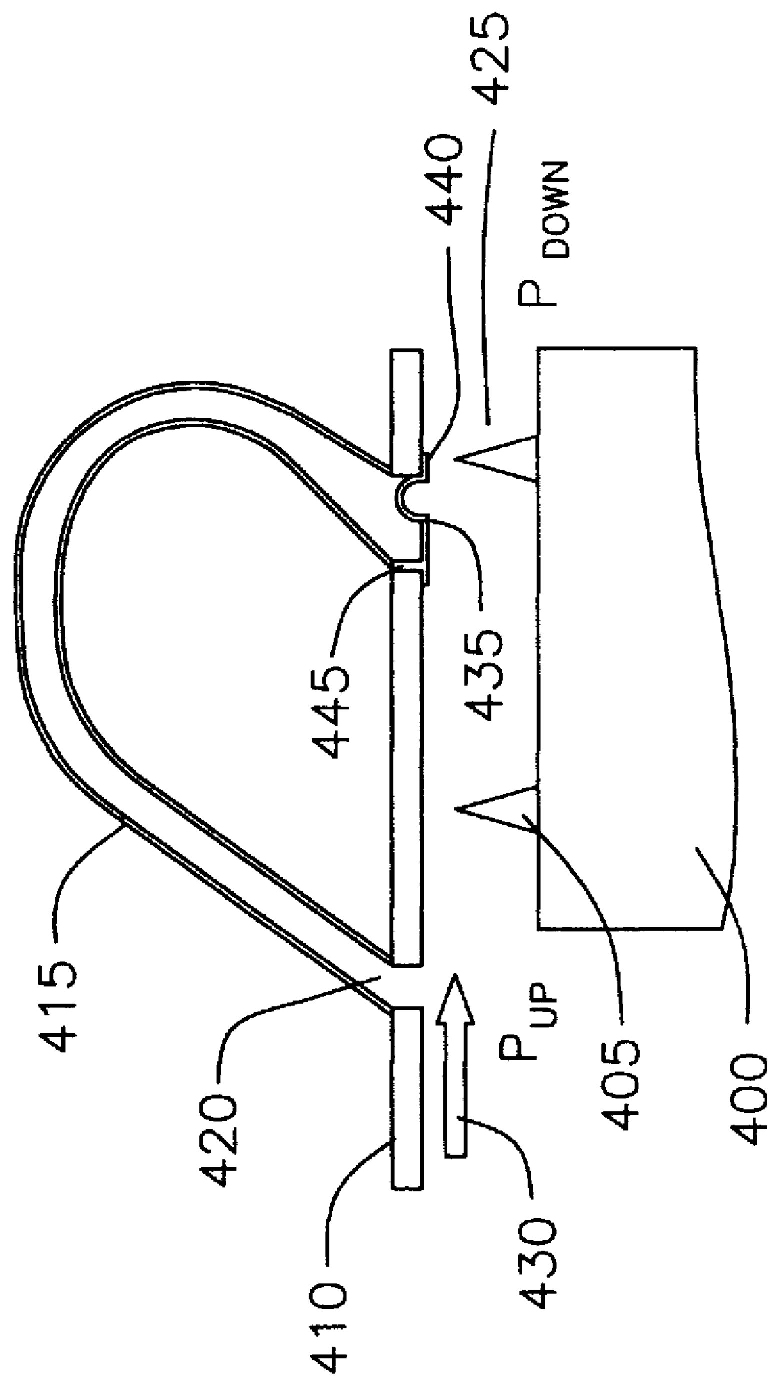
FIG. 4 is a schematic cross-sectional view of a gap closure device according to a second embodiment of the present invention.

FIG. 4 is a schematic cross-sectional view of a gap closure component according to a second embodiment of the present invention. Parts in FIG. 4 that are similar to parts used in FIGS. 2-3 are applied with like reference elements, except that the reference elements used in FIG. 4 are preceded with the numeral 4. The gap closure component of the embodiment shown in FIG. 4 is a flap seal 435 that comprises a bellow bend 440 welded at one end and a vertical lip 445 at an end opposite therefrom. In this embodiment, bellow bend 440 mates with seal tooth 405 in the presence of the pressure differential and vertical lip 445 contacts low pressure end 425 of passage 415 in the absence of the pressure differential. Bellows bend 440 will lower the spring constant and stresses of the flap seal, while vertical lip 445 helps contain pressure and prevent flutter of the flap seal.

Figure 5:
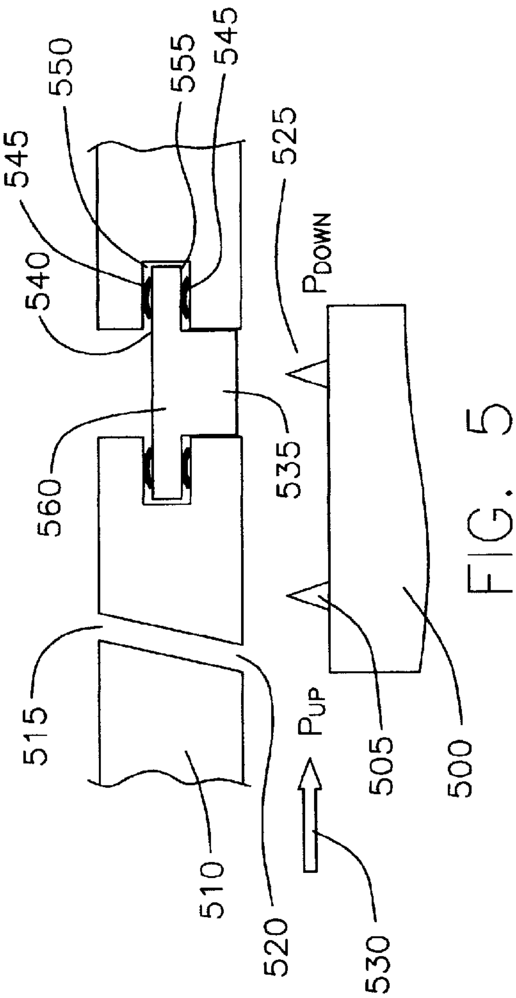
FIG. 5 is a schematic cross-sectional view of a gap closure device according to a third embodiment of the present invention.

FIG. 5 is a schematic cross-sectional view of a gap closure component according to a third embodiment of the present invention. Parts in FIG. 5 that are similar to parts used in FIGS. 2-3 are applied with like reference elements, except that the reference elements used in FIG. 5 are preceded with the numeral 5. The gap closure component of the embodiment shown in FIG. 5 comprises a piston 535 placed in a groove 540 of the diaphragm outer ring 510 at a low pressure end 525 of the passage 515. For ease of illustration, note that passage 515 of FIG. 5 is not shown in full as in the previous figures. In this embodiment, there are a plurality of curved springs 545 that each abut a top section 550 and bottom section 555 at opposing ends of an upper portion 560 of piston 535 and a portion of groove 540 of the diaphragm outer ring 510. Those skilled in the art will recognize that this embodiment may operate without the use of the upper curved springs 545 as long as the lower curved springs 545 are well-designed. Basically, the function of the upper curved springs 545 is to position the piston 535 and keep the assembly from rattling around. Upper curved springs 545 also help balance the load so that a lower pressure difference can activate the seal. Lower curved springs 545 are used to return piston 535 to its original position in the absence of a pressure differential. A secondary function of the curved springs 545 is to seal the gaps around piston 535.

Figure 6:
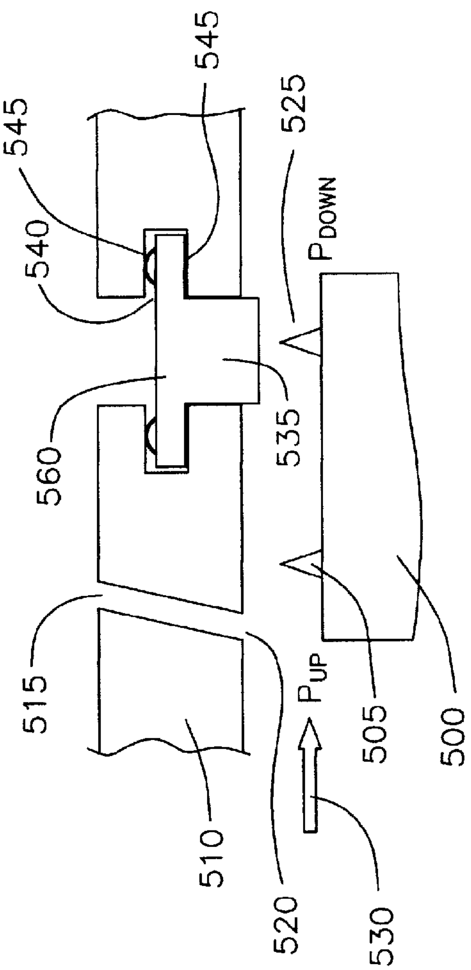
FIG. 6 is a schematic cross-sectional view showing the gap closure device of FIG. 5 in an activated state in the presence of a pressure differential.

Piston 535 as shown in FIG. 5 is at rest or in the inactive state. That is, a pressure differential has not formed across high pressure end 520 and low pressure end 525 of passage 515. FIG. 6 shows piston 535 in an activated state when the pressure differential has formed. In the activated state as shown in FIG. 6, the presence of the pressure differential unbalances the load of plurality of curved springs 545 forcing piston 535 in steam flow path 530 through the seal teeth 505 of the bucket cover 500 and the diaphragm outer ring 510.

In another embodiment, it is possible to even use only one curved spring 545. Further, in another embodiment, it may be possible to have a gap closure component that does not utilize any curved springs. In this embodiment, pistons in the bottom half of the turbine would not need a return mechanism because gravity would cause them to return to their initial position.

Figure 7:
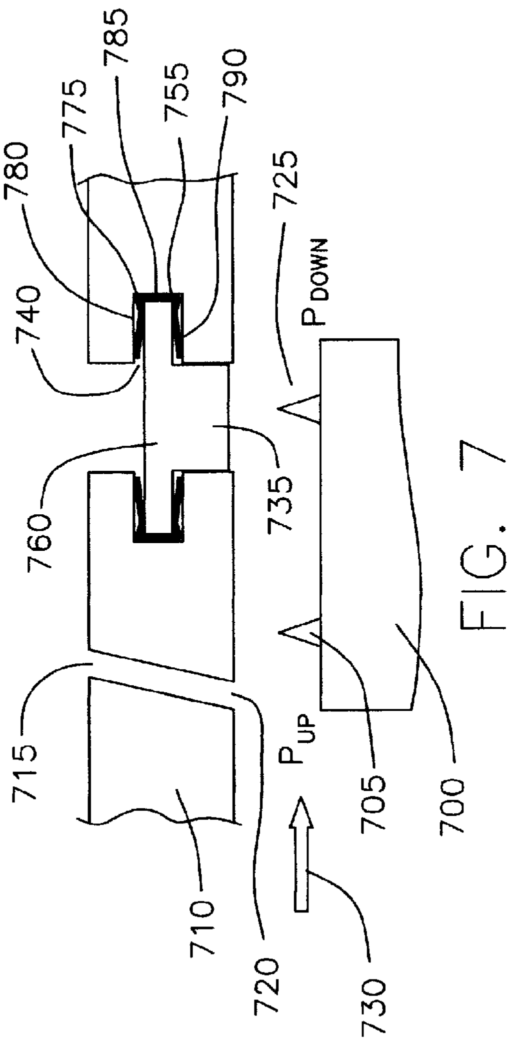
FIG. 7 is a schematic cross-sectional view of a gap closure device according to a fourth embodiment of the present invention.

FIG. 7 is a schematic cross-sectional view of a gap closure component according to a fourth embodiment of the present invention. Parts in FIG. 7 that are similar to parts used in FIGS. 5-6 are applied with like reference elements, except that the reference elements used in FIG. 7 are preceded with the numeral 7. In the embodiment of FIG. 7, two two-sided springs 775 are used to abut a top section 780, a side section 785 and a bottom section 790 of an upper portion 760 of piston 735 and a portion of the groove 740 of the diaphragm outer ring 710. The two two-sided springs 775 clip on side sections 785. In this configuration, parts count is reduced as compared to the embodiment shown in FIGS. 5-6 and the possibility of misaligned springs is reduced.

Figure 8:
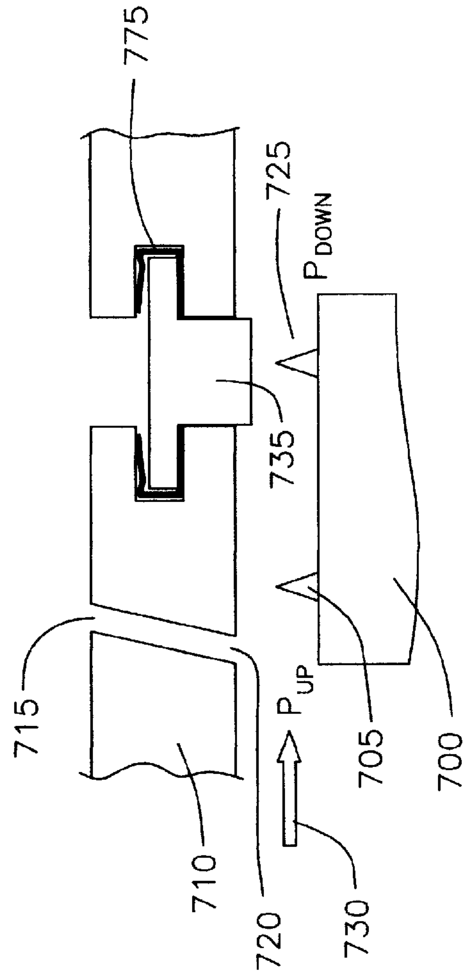
FIG. 8 is a schematic cross-sectional view showing the gap closure device of FIG. 7 in an activated state in the presence of a pressure differential.

Piston 735 as shown in FIG. 7 is at rest or in the inactive state. That is, a pressure differential has not formed across high pressure end 720 and low pressure end 725 of passage 715. FIG. 8 shows piston 735 in an activated state when the pressure differential has formed. In the activated state as shown in FIG. 8, the presence of the pressure differential unbalances the load of the two-sided springs 775 forcing piston 735 in a steam leakage path emanating from steam flow path 730 through the seal teeth 705 of the bucket cover 700 and the diaphragm outer ring 710. Like the embodiment described with reference to FIGS. 5-6, it is possible to even use only one two-side spring 775 or not any spring at all.

Figure 9:
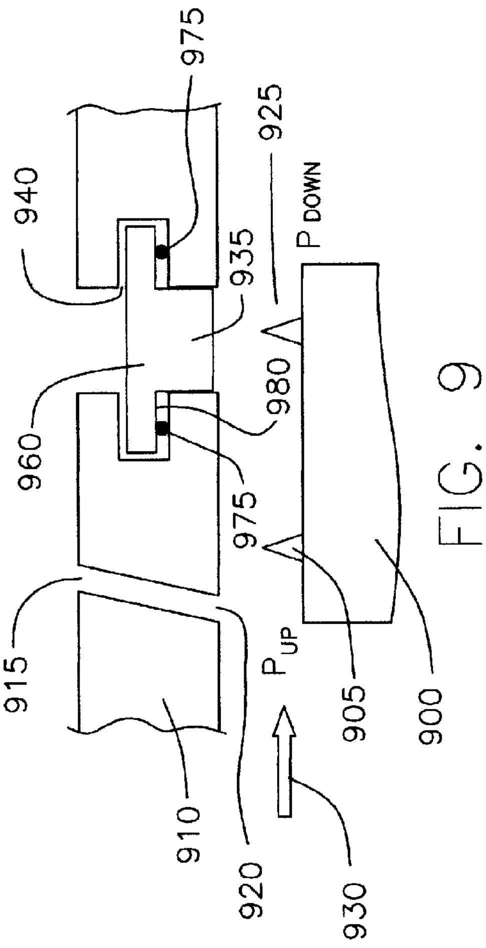
FIG. 9 is a schematic cross-sectional view of a gap closure device according to a fifth embodiment of the present invention.

FIG. 9 is a schematic cross-sectional view of a gap closure component according to a fifth embodiment of the present invention. Parts in FIG. 9 that are similar to parts used in FIGS. 5-6 are applied with like reference elements, except that the reference elements used in FIG. 9 are preceded with the numeral 9. In the embodiment of FIG. 9, elastomeric elements 975 are used to abut a bottom section 980 of an upper portion 960 of piston 935 and a portion of groove 940 of diaphragm outer ring 910. Those skilled in the art will recognize that elastomeric elements 975 may be comprised of various shapes and be either solid or hollow. A non-exhaustive list of possible elastomeric materials that can be used in this embodiment for low-temperature stages of the steam turbine include VITON (400 degrees Fahrenheit), which is a registered trademark of DuPont Dow Elastomers and SILASTIC (600 degrees Fahrenheit), which is a registered trademark of Dow Corning Corporation.

Figure 10:
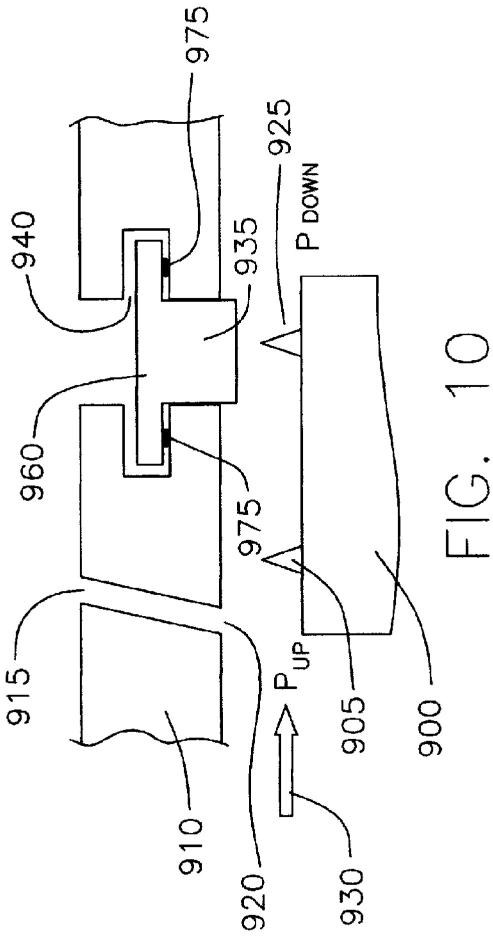
FIG. 10 is a schematic cross-sectional view showing the gap closure device of FIG. 9 in an activated state in the presence of a pressure differential.

Piston 935 as shown in FIG. 9 is at rest or in the inactive state. That is, a pressure differential has not formed across high pressure end 920 and low pressure end 925 of passage 915. FIG. 10 shows piston 935 in an activated state when the pressure differential has formed. In the activated state as shown in FIG. 10, the presence of the pressure differential unbalances the load of the elastomeric elements 975 forcing piston 935 in a steam leakage path emanating from steam flow path through the one or more seal teeth 905 of the bucket cover 900 and the diaphragm outer ring 910.

In another embodiment, it is possible to use only one elastomeric element 975. Further, in another embodiment, it may be possible to have a gap closure component that does not utilize any elastomeric element. In this embodiment, pistons in the bottom half of the turbine would not need a return mechanism because gravity would cause them to return to their initial position.

Figure 12:
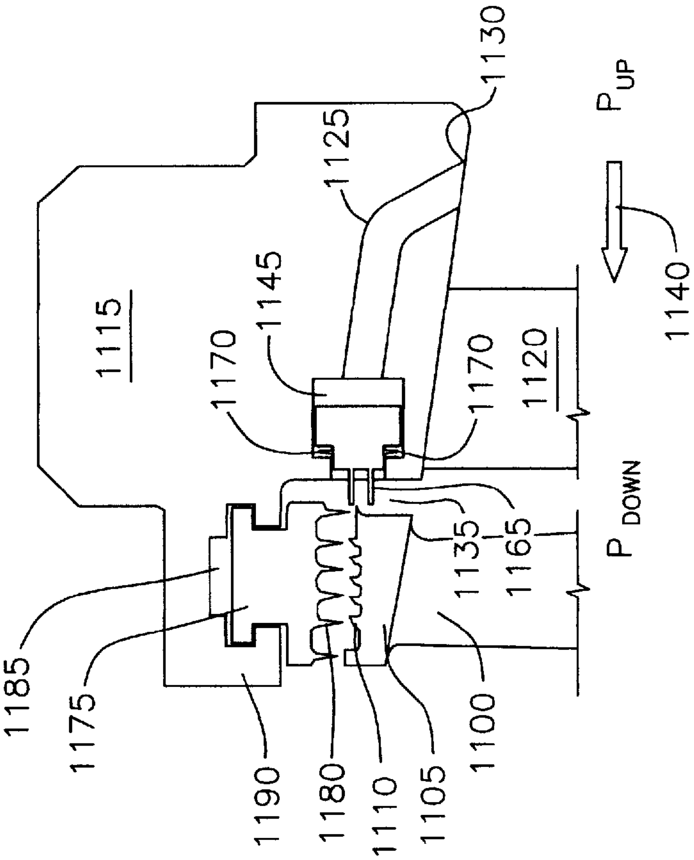
FIG. 12 is a schematic cross-sectional view showing the gap closure device of FIG. 11 in an activated state in the presence of a pressure differential.
Figure 11:
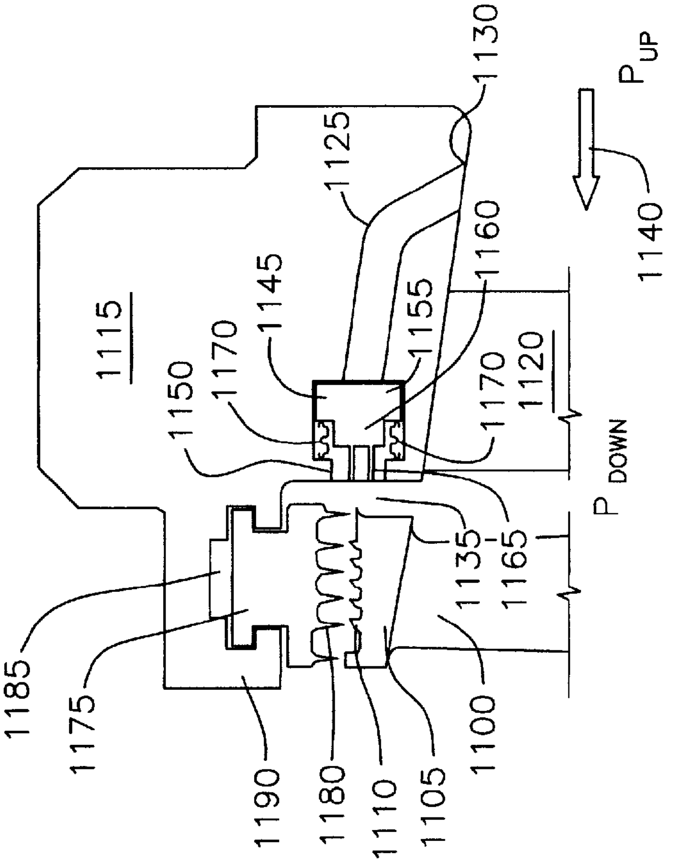
FIG. 11 is a schematic cross-sectional view of a gap closure device according to a sixth embodiment of the present invention.

FIGS. 11-12 are schematic cross-sectional views of a gap closure device according to a sixth embodiment of the present invention. FIGS. 11-12 are similar to FIGS. 3-10 in that only a simplified illustration of a steam turbine is shown, however, FIGS. 11-12 show some more detail of the rotary and stationary components of a steam turbine. In particular, FIGS. 11-12 show a bucket 1100 having a tip cover 1105 with seal teeth 1110 for the rotary component and a diaphragm outer ring 1115 and mounting partitions 1120 for the stationary component. Diaphragm outer ring 1115 includes a passage 1125 formed therein that connects a high pressure end 1130 of a turbine stage to a low pressure end 1135 of the turbine stage. In this embodiment, passage 1125 preferably is a channel formed in diaphragm outer ring 1115 that provides an alternative path for steam flow path 1140 to travel as it flows from a high pressure upstream location ($P_{UP}$) to a low pressure downstream location ($P_{DOWN}$).

The gap closure component of the embodiment shown in FIGS. 11-12 comprises a piston 1145 placed in a groove 1150 of the diaphragm outer ring 1115 at low pressure end 1135 of passage 1125 that acts axial. Piston 1145 comprises a top portion 1155 and a bottom portion 1160. Top portion 1155 has a larger volume than bottom portion 1160. In addition, bottom portion 1160 has one or more seal teeth 1165 projecting outward therefrom. Those skilled in the art will recognize that this embodiment can work with piston 1145 having only a single seal tooth, or without any seal teeth if desired. The one or more seal teeth 1165 projecting outward from the bottom 1160 of piston 1145 are forced in a steam leakage path through the one or more seal teeth 1110 of the bucket cover 1105 and the diaphragm outer ring 1115 in the presence of the pressure differential as shown in FIG. 12. More specifically, a single seal tooth 1105 sticks out from the bucket in the axial direction. The piston-activated seal provided by piston 1145 overlaps the axial tooth 1110 coming off the bucket to further block flow and create a tortuous path for leakage flow. FIGS. 11-12 further show that the gap closure component of this embodiment comprises at least two spring elements 1170. Each spring element 1170 abuts the top portion and the bottom portion of piston 1145 and a portion of groove 1150 of the diaphragm outer ring 1115. Although FIGS. 11-12 disclose the use of two spring elements, it is possible to utilize only spring element, no spring elements or use a similar functioning device therefore (elastomeric elements). As shown in FIG. 12, the presence of the pressure differential unbalances the load of the two spring elements 1170 forcing the one or more seal teeth 1165 to project outward from the bottom of the piston 1145 forced in the steam leakage path through the one or more seal teeth 1110 of the bucket cover 1105 and the diaphragm outer ring 1115. Those skilled in the art will recognize that the seal of this embodiment may work with only one spring element 1170 and thus this embodiment is not limited by the number of spring elements shown in FIGS. 11-12.

An additional element shown in the embodiment of FIGS. 11-12 includes a seal carrier 1175 having one or more seal teeth 1180 located in a groove 1185 of an extension 1190 of the diaphragm outer ring 1115. Seal carrier 1175 is radial with respect to the one or more seal teeth 1110 of the bucket cover 1105. Seal carrier 1175 also servers to provide a seal of the seal path flowing through the rotary component and stationary component of the steam turbine.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A steam turbine, comprising:

a rotary component including a plurality of circumferentially spaced buckets that are spaced at axial positions, each of the plurality of buckets having a tip with an adjacent cover that includes one or more seal teeth;

a stationary component including a plurality of diaphragms each having a diaphragm outer ring and an inner diaphragm ring separated by a mounting partition, the plurality of diaphragms are axially positioned between adjacent rows of the plurality of buckets, each row forms a turbine section that defines a portion of a steam flow path through the turbine, each diaphragm outer ring having a passage formed therein that connects a high pressure end to a low pressure end; and a gap closure component located about the rotary component and the stationary component to seal a portion of a steam leakage path, the gap closure component including a plurality of gap closure devices, each of the plurality of gap closure devices located about each respective diaphragm outer ring and one or more seal teeth of a bucket cover, each of the plurality of gap closure devices activated by a pressure differential formed across the passage of a respective diaphragm outer ring that provides a seal of the steam leakage path through the one or more seal teeth of the bucket cover and the diaphragm outer ring.

2. The steam turbine according to claim 1, wherein each of the plurality of gap closure devices comprises a flap seal hinged to the diaphragm outer ring at a low pressure end of the passage formed in the diaphragm outer ring, the flap seal opening the low pressure end of the passage in the presence of the pressure differential, the flap seal moving away from the low pressure end of the passage to cover a seal tooth of the bucket cover in the presence of the pressure differential, the flap seal covering a face of the seal tooth that is exposed to a region of high pressure.

3. The steam turbine according to claim 2, wherein the flap seal comprises a bellow bend at one end and a vertical lip at an end opposite therefrom.

4. The steam turbine according to claim 1, wherein each of the plurality of gap closure devices comprises a piston placed in a groove of the diaphragm outer ring at a low pressure end of the passage, the piston forced into the steam leakage path through the one or more seal teeth of the bucket cover and the diaphragm outer ring in the presence of the pressure differential.

5. The steam turbine according to claim 4, wherein each of the plurality of gap closure devices further comprises a plurality of curved springs that each abut a top section and bottom section at opposing ends of an upper portion of the piston and a portion of the groove of the diaphragm outer ring, the presence of the pressure differential unbalances the load of the plurality of curved springs forcing the piston in the steam leakage path through the one or more seal teeth of the bucket cover and the diaphragm outer ring.

6. The steam turbine according to claim 4, wherein each of the plurality of gap closure devices further comprises at least one two-sided spring, each at least one two-sided spring abutting a top section, a side section and a bottom section of an upper portion of the piston and a portion of the groove of the diaphragm outer ring, the presence of the pressure differential unbalances the load of the at least one two-sided spring forcing the piston in the steam leakage path through the one or more seal teeth of the bucket cover and the diaphragm outer ring.

7. The steam turbine according to claim 4, wherein each of the plurality of gap closure devices further comprises at least one elastomeric element, the at least one elastomeric element abutting a bottom section of an upper portion of the piston and a portion of the groove of the diaphragm outer ring, the presence of the pressure differential unbalances the load of the at least one elastomeric element forcing the piston in the steam leakage path through the one or more seal teeth of the bucket cover and the diaphragm outer ring.

8. The steam turbine according to claim 1, wherein each of the plurality of gap closure devices comprises a piston placed in a groove of the diaphragm outer ring at a low pressure end of the passage that acts axial, the piston comprising a top portion and a bottom portion, the top portion having a larger volume than the bottom portion, the bottom portion having one or more seal teeth projecting outward therefrom, the one or more seal teeth projecting outward from the bottom of the piston forced in the steam leakage path through the one or more seal teeth of the bucket cover and the diaphragm outer ring in the presence of the pressure differential.

9. The steam turbine according to claim 8, wherein each of the plurality of gap closure devices further comprises at least one spring element, each at least one spring element abutting the top portion and the bottom portion of the piston and a portion of the groove of the diaphragm outer ring, the presence of the pressure differential unbalances the load of the at least one spring element forcing the one or more seal teeth projecting outward from the bottom of the piston forced in the steam leakage path through the one or more seal teeth of the bucket cover and the diaphragm outer ring.

10. The steam turbine according to claim 8, wherein each diaphragm outer ring comprises a seal carrier having one or more seal teeth located in a groove of an extension of the diaphragm outer ring that is radial with respect to the one or more seal teeth of the bucket cover.

11. The steam turbine according to claim 1, wherein each of the plurality of gap closure devices retract in the absence of the pressure differential.

* * * * *